(12) United States Patent
Heidbreder et al.

(10) Patent No.: US 7,396,455 B2
(45) Date of Patent: Jul. 8, 2008

(54) BRINE CONTAINER WITH FILTER SYSTEM

(75) Inventors: Eric Heidbreder, Werther (DE); Christoph Umbach, Werther (DE)

(73) Assignee: Schröder Maschinebau KG, Werther (DE)

( * ) Notice: Subject to any disclaimer, the term of this patent is extended or adjusted under 35 U.S.C. 154(b) by 459 days.

(21) Appl. No.: 11/045,612

(22) Filed: Jan. 27, 2005

(65) Prior Publication Data

US 2005/0161376 A1    Jul. 28, 2005

(30) Foreign Application Priority Data

Jan. 28, 2004    (DE)    ........... 10 2004 004 121

(51) Int. Cl.
A23B 4/26    (2006.01)
(52) U.S. Cl. ........... 210/167.01; 210/90; 210/195.1; 99/535
(58) Field of Classification Search ........... 210/90, 210/194–197, 167.01, 167.03; 99/535
See application file for complete search history.

(56) References Cited

U.S. PATENT DOCUMENTS

| | | | |
|---|---|---|---|
| 4,094,237 A * | 6/1978 | Riordan | 99/451 |
| 4,815,368 A | 3/1989 | Nelles | |
| 6,004,464 A | 12/1999 | Lien | |
| 6,451,270 B1 | 9/2002 | Killian et al. | |
| 6,976,421 B2 * | 12/2005 | Hansen et al. | 99/487 |
| 2002/0152901 A1 | 10/2002 | Basile et al. | |
| 2003/0167934 A1 | 9/2003 | Hansen et al. | |
| 2005/0023196 A1 * | 2/2005 | Ku | 210/90 |

FOREIGN PATENT DOCUMENTS

| | | |
|---|---|---|
| EP | 0 164 225 | 12/1985 |
| EP | 0 584 875 | 3/1994 |
| GB | 199 663 | 6/1923 |
| GB | 395 508 | 7/1933 |
| GB | 862 307 | 3/1961 |
| GB | 1 525 968 | 9/1978 |
| JP | 08 000239 | 1/1996 |
| PT | 94 747 | 1/1992 |
| RU | 2 060 027 | 5/1996 |
| SU | 568 429 | 11/1977 |
| SU | 1 752 785 | 8/1992 |

OTHER PUBLICATIONS

English Machine Translation of JP 08000239 printed from JPO website Dec. 19, 2007.*
Patent Abstracts of Japan (0800239). (May 31, 1996).
Derwent, XP002323513 (SU 568 429). (Nov. 9, 1977).
Derwent, XP002323514 (PT 94 747). (Jan. 31, 1992).
Derwent, XP002323515 (RU 2 060 027). (May 20, 1996).
Derwent, XP002323516 (SU 1 752 785). (Aug. 7, 1992).

* cited by examiner

Primary Examiner—Terry K Cecil
(74) Attorney, Agent, or Firm—Richard M. Goldberg

(57) ABSTRACT

Brine container, at which a suction filter (24) is disposed, in which the brine container has a circulating filter system (28), which has a filter (34) and a pump (30), with which the brine (22) can be pumped through the circulating filter system (28), the filter (34) having an exchangeable filter element (38).

6 Claims, 2 Drawing Sheets

BRINE CONTAINER WITH FILTER SYSTEM

BACKGROUND OF THE INVENTION

The invention relates to a brine container, at which a suction filter is disposed.

It may, for example, be a brine container for pickling brine, which is pumped away through the suction filter and supplied to a pickling machine. Usually, pickling brine, flowing off from the pickling machine, is recycled over a coarse filter into the brine container. The function of the suction filter is to protect the brine pump and to prevent blockage of the injection needles of the pickling machine by particles or impurities that have been introduced. Over time, the suction filter is blocked by particles filtered out of the pickling brine and can be removed manually, for example, for cleaning purposes.

It is known that an additional filter may be provided between the coarse filter and the suction filter in the brine container in order to avoid rapid blockage of the suction filter. Usually, a slide filter is pushed for this purpose from above into the brine container, so that the latter is divided into two regions with different degrees of contamination of the brine. The slide filter becomes contaminated gradually and must be removed at regular intervals for cleaning purposes. Even when several such slide filters are used, brine of a higher degree of contamination may be introduced into a region of brine of lower degree of contamination during the removal of a filter for cleaning purposes.

SUMMARY OF THE INVENTION

It is an object of the invention to provide a brine container of the type named above, for which the suction filter can be unburdened permanently and reliably.

Pursuant to the invention, this objective is accomplished owing to the fact that the brine container has a circulating filter system, which has a filter and a pump, with which the brine can be pumped through the circulating filter system, the filter having an exchangeable filter element.

Accordingly, the brine can be pumped constantly through the circulating filter system and, at the same time, be filtered. In this way, impurities are removed from the brine. Due to the circulating filter system, dirt particles can be removed effectively and to a large extent from the circulating brine, so that the suction filter is relieved and is contaminated only much slower. Furthermore, during an exchange of filter elements, brine can continue to be removed from the brine container over the suction filter, so that a pickling machine, for example, can be operated continuously. This is particularly advantageous, since the filter element can be exchanged or removed and cleaned without interrupting the production.

Advantageous developments of the invention arise out of the dependent claims.

In a preferred embodiment, the brine container has a recycling region and a separate suction region. The suction filter is disposed in the suction region and the brine can be pumped by the pump of the circulating filter system from the recycling region into the suction region. In this connection, it is a particular advantage that the suction region is supplied with brine, which was filtered by the filter system. As a result, the degree of contamination is less in the suction region of the brine container than in the recycling region of the brine container. Because of the lesser degree of contamination, there is a clearly lesser burden on the suction filter, which becomes contaminated, if the worst comes to the worst, very slowly. For exchanging the filter element, the inlet to the filter preferably can be shut off, so that the filter or the filter element can be removed without pumping unfiltered brine into the suction region. Alternatively, the pump could also be switched off for exchanging the filter element. In both cases, it is advantageous that, when a filter element is exchanged, unfiltered brine cannot reach the suction region. In continuous operation, the suction filter can this be unburdened even more effectively.

In a preferred embodiment, the recycling region and the suction region are connected by a permeable separation filter. The separation filter is made, for example, from sheet metal with slots or other openings. The separation filter permits transfer of brine between the recycling region and the suction region of the brine container and enables the levels in the two regions to equalize. Since, depending on the output of the pump of the filter system, hardly any brine flows through the separation filter or the brine flows essentially from the suction region back into the recycling region, the separation filter is hardly contaminated. Some flow in the brine container, caused by the pump of the filter system, is advantageous in order to keep the brine in motion, so that fewer solids are deposited at the bottom.

Alternatively, the recycling region and the suction region can also be constructed as separate basins. The levels, to which the two basins are filled, can be used by way of a level switch or a different level sensor for controlling the output of the pump of the filter system or for intermittently switching the pump off.

In a preferred embodiment, the filter system has at least two filters, the inlet sides of which can be shut off by means of a switching device. In this case, the inlet, for example, of one filter, the filter element of which is to be exchanged, can be shut off by means of the switching device. It is also conceivable to operate one filter with the switching device until it is to be exchanged and switching the other filter on only then. Depending on the arrangement and construction of the filter system, it may preferably be possible to switch off the outlet sides of the filters as well.

Preferably, the filter system has a pressure-measuring device for measuring the pressure difference in front of and behind the filter. This may be connected, for example, to a monitoring device for the pressure difference, which emits a signal when a limiting value is exceeded. If, for example, the difference in pressure becomes too large because of contamination of the filter, then this can be indicated on a display, which points out the need to change the filter, so that there is no need to check the filter visually.

In the case of several filters, which can be switched by the switching device, switching from an active filter to another filter can also be automatic when a limiting value of the pressure difference is exceeded. In this way, when a filter is full, it is possible to switch automatically to the next filter, so that the latter is used and the full filter can meanwhile be exchanged.

Instead of measuring the difference in pressure in front of and behind the filter or additionally, it is also possible to measure the power consumption of the pump of the filter system.

BRIEF DESCRIPTION OF THE DRAWINGS

In the following, examples of the invention are explained in greater detail by means of the drawing, in which.

DETAILED DESCRIPTION

Figure 1:
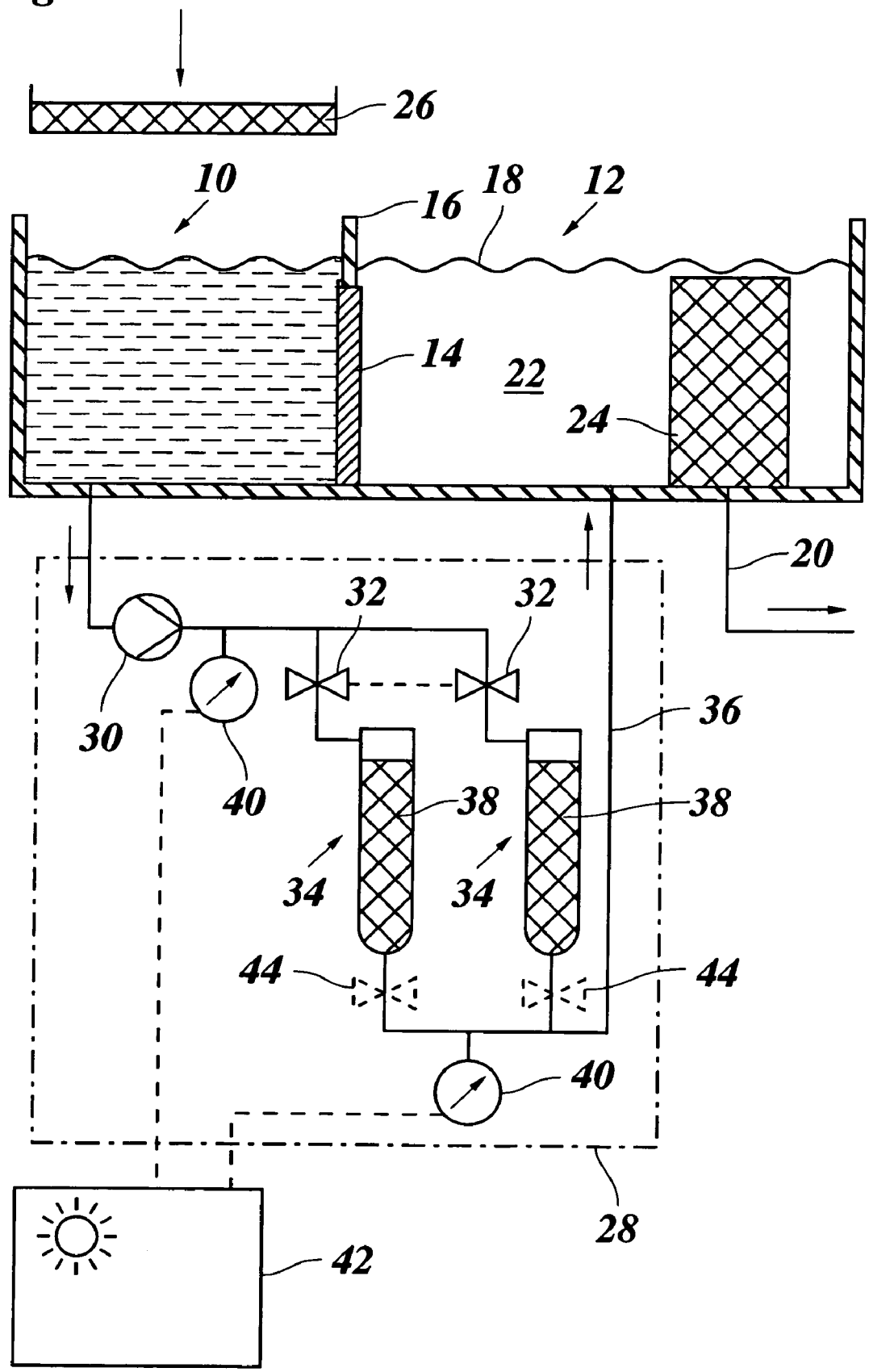
FIG. 1 shows a brine container with a filter system and FIG. 2 shows a brine container, for which the filter system combines two separate basins with one another.

FIG. 1 shows a brine container with a recycling region 10 and a suction region 12, which are separated from one another by a separating filter 14, which is inserted in the brine container. The separation filter 14, in its upper region, has a wall 16, with which it protrudes above the liquid surface 18. The brine container is, for example, part of a pickling machine, which is supplied with pickling brine 22, which is aspirated through a suction filter 24, by means of a pump over a suction pipeline 20. The suction filter 24 produces, for example, a finer filtration than does the separation filter 14.

Brine, discharging from the pickling machine, is recycled over a coarse filter 26 to the recycling region 10. After the coarse filtration, the brine in the recycling region 10 still has a certain degree of contamination. The recycling region 10 and the suction region 12 are connected by a circulating filter system 28, which is shown symbolically and explained in greater detail below.

The filter system 28 has a pump 30, which can be connected over valves 32 with filters 34. The brine, filtered by the filters 34, is passed over a pipeline 36 into the suction region 12.

The filters 34 are, for example, exchangeable filter cartridges, through which the brine flows from the inside to the outside and which bring about a fine filtration of the brine. Impurities, contained in the brine, are collected in the interior of the filter inserts 38 of the filters. A full filter can be removed from the filter system after the appropriate valve 32 has been closed and cleaned or replaced by a new filter. Different filter inserts 38 can be used, depending on the type of brine. Alternatively, it is also possible just to remove the filter inserts 38.

The valves 32, for example, are connected with one another in such a manner, that they form a switching device, which opens the inlet in each case to one of the two filters 34. In this way, a filter 34 can be used until it is full. The respectively other filter 34 is then available, so that a full filter insert 38 can be removed and cleaned without stopping the operation.

In each case, a pressure-measuring device 40 is disposed in front of and behind the filters. The pressure-measuring devices 40 are connected to a monitoring device 42, which monitors the pressure difference in front of and behind the filters. If a limiting value is exceeded, as may happen, for example, in the case of a full filter 34, the monitoring device 42 emits a visual and/or acoustic signal. The pressure-measuring devices 40 or the monitoring device 42 may, moreover, be connected to a display indicating the degree of contamination.

The filter system 28 may, for example, be installed as an assembly next to the brine container. The filters 34 are disposed right next to the basin of the brine container. The filter inserts 38 can be removed in the upward direction from the filters 34 through appropriate openings. These openings are above the liquid surface 18, so that brine 22 does not run out of the suction region 12. However, the filters 34 are disposed so that, when a filter insert 38 is removed, accidental contamination of the basin of the brine container is avoided.

Alternatively, the filters 34 may also be disposed horizontally and also connected completely below the liquid surface 18, however outside of the basin of the brine container. In this case, further valves 44 must be provided on the outlet side of the filters 34, in order to prevent brine 22 running out while a filter is exchanged. These valves 44 are shown in FIG. 1 by broken lines.

Due to the inflow of brine through pipeline 36 into the suction region 12, there is, for example, a slight flow from the suction region 12 through the separation filter 14 into the recycling region 10. The separation filter 14 therefore hardly becomes contaminated and, moreover, this flow brings about some circulation of the brine in the basin.

Alternatively to the example described, it is also possible to do without the separation filter 14. The brine 22 is then cleaned and circulated continuously by the circulation filter system 28, as a result of which the degree of contamination in the brine container is kept small.

Figure 2:
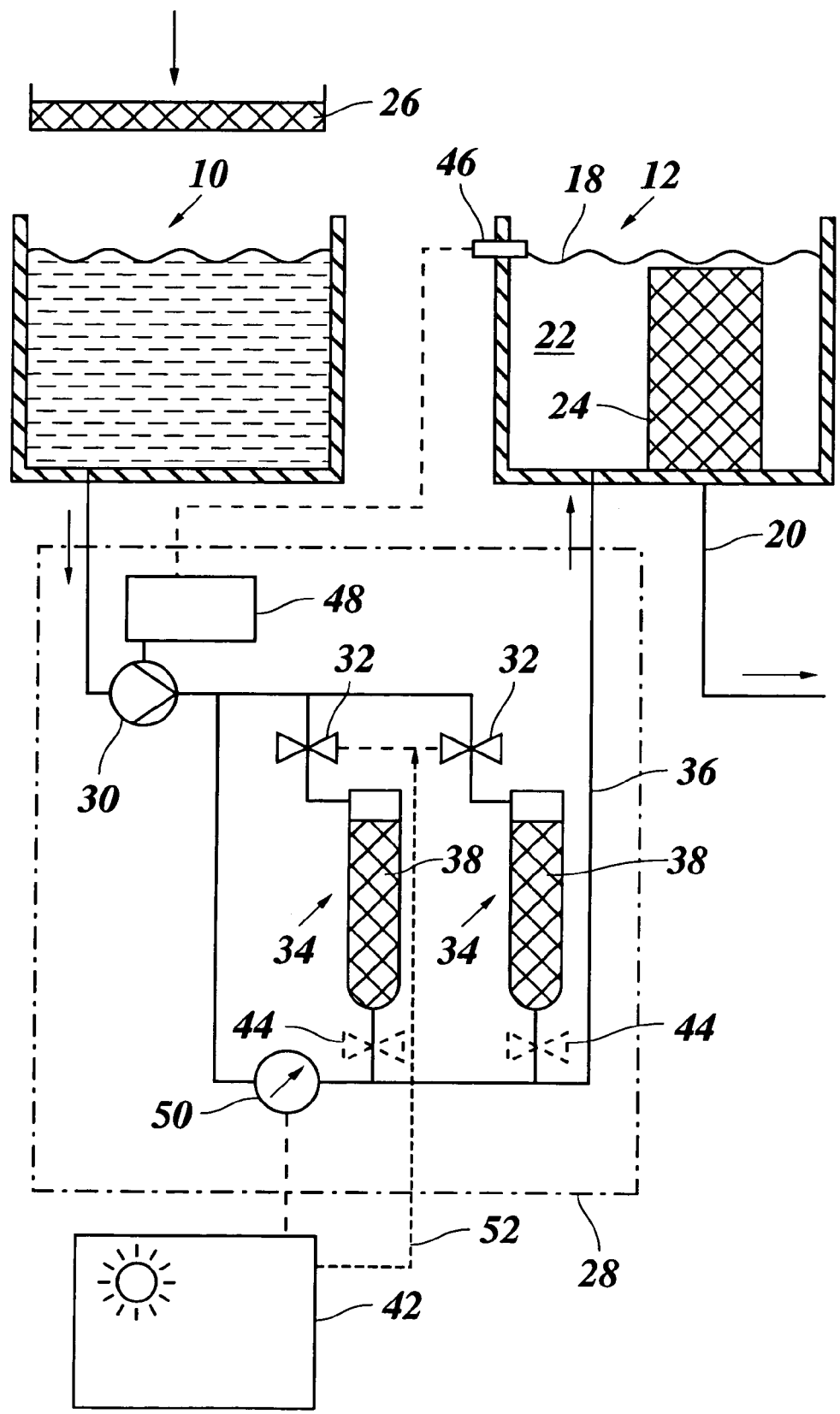

FIG. 2 shows a further embodiment, for which the recycling region 10 and the suction region 12 are constructed as separate basins. The pump 30, in interval operation, is controlled by a level indicator 46 and a pump control system 48, so that a maximum level in the suction region 12 is not exceeded.

In the example of FIG. 2, a pressure difference measuring device 50, which measures the difference in pressures in front of and behind the filters 34 directly, is provided instead of the two pressure measuring devices 40. The pressure-measuring device 50 once again is connected with a monitoring device 42, which emits a visual and/or acoustic signal when a limiting value is exceeded. In this example, it also emits a signal 52 with which, when a limiting value is exceeded, an automatic switching over of filters 34 is brought about for the valves 32.

For this embodiment also, further valves 44 may be provided on the outlet side of the filters 34 and the filters optionally may be installed upright or horizontally.

The construction of the filter system, which has been described, is given merely as an example. For example, in the case of the examples given, it is conceivable that, instead of the interconnected valves 32, a switch-over valve is provided, over which, depending on the setting of the switch-over valve, the inlet side of the one or the other filter 34 is connected with the pump 30. The valves 44 may also be connected or replaced by a switch-over valve. Alternatively, the pump may also be disposed in the pipeline 36.

The invention claimed is:

1. A brine container comprising:
    a recycling region,
    a suction region having a suction filter disposed therein and an output receiving filtered brine from said suction filter, said output adapted to supply said filtered brine to a pickling machine,
    a circulating filter system including:
        an inlet from said recycling region and an outlet to said suction region,
        a pump for pumping the brine from the recycling region through the circulating filter system into the suction region, and
        a filter having an exchangeable filter element through which the brine is pumped, and
    a permeable separation filter forming a portion of a common wall between said regions and which is permeable by the brine and which connects the recycling region and the suction region.

2. The brine container of claim 1, wherein the circulating filter system includes:
    at least two said filters, and
    a switching device for shutting off inflow sides of said at least two said filters.

3. The brine container of claim 1, wherein the circulating filter system includes a pressure-measuring device for measuring a difference in pressure in front of and behind the filter of the circulating filter system.

4. The brine container of claim 3, further comprising a monitoring device, which monitors the difference in pressure in front of and behind the filter of the circulating filter system and emits a signal when a limiting value is exceeded.

5. The brine container of claim 1, wherein the recycling region and the suction region are not constructed as separate basins.

6. The brine container of claim 1, wherein the permeable separation filter permits transfer of brine in both directions from the recycling region to the suction region and from the suction region to the recycling region.

* * * * *